United States Patent
Lindoff et al.

(10) Patent No.: US 7,684,312 B2
(45) Date of Patent: Mar. 23, 2010

(54) METHOD AND APPARATUS FOR FAST FFT PROCESSING OF PAGING INFORMATION

(75) Inventors: Bengt Lindoff, Bjärred (SE); Thomas Olsson, Karishamn (SE); Bo Bernhardsson, Lund (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1059 days.

(21) Appl. No.: 11/276,384

(22) Filed: Feb. 27, 2006

(65) Prior Publication Data

US 2007/0171813 A1 Jul. 26, 2007

Related U.S. Application Data

(60) Provisional application No. 60/743,115, filed on Jan. 10, 2006.

(51) Int. Cl.
*H04J 11/00* (2006.01)
(52) U.S. Cl. .................... 370/210; 370/203; 708/404
(58) Field of Classification Search ................ 370/203, 370/210, 310, 328, 329, 330; 342/175, 195, 342/196; 708/100, 200, 400, 403, 404
See application file for complete search history.

(56) References Cited

U.S. PATENT DOCUMENTS

| 5,761,190 | A | | 6/1998 | Yamauchi et al. |
| 5,870,673 | A | * | 2/1999 | Haartsen ............... 455/426.1 |
| 6,757,344 | B2 | | 6/2004 | Carleton |

| 2002/0159426 | A1* | 10/2002 | Kanemoto et al. ......... 370/342 |
| 2005/0094550 | A1* | 5/2005 | Huh et al. .................. 370/203 |
| 2005/0180361 | A1* | 8/2005 | Hansen et al. ............. 370/334 |
| 2005/0201267 | A1* | 9/2005 | Belotserkovsky et al. ... 370/206 |
| 2005/0243940 | A1* | 11/2005 | Huh et al. ................. 375/260 |

FOREIGN PATENT DOCUMENTS

| DE | 4327588 A1 | 2/1995 |
| EP | 0788264 A2 | 8/1997 |
| EP | 1079576 A2 | 2/2001 |
| EP | 1180866 A1 | 2/2002 |
| EP | 1435750 A1 | 7/2004 |
| EP | 1530319 A2 | 5/2005 |
| JP | 08-265295 | 10/1996 |
| JP | 2003-218833 | 7/2003 |
| WO | WO 2005/067246 A2 | 7/2005 |

* cited by examiner

*Primary Examiner*—Chi H Pham
*Assistant Examiner*—Weibin Huang
(74) *Attorney, Agent, or Firm*—Michael G. Cameron

(57) ABSTRACT

A method and corresponding apparatus for fast FFT processing of paging information includes receiving an analog signal that is converted to a first digital signal and digitally filtered through a first filter having a first bandwidth ($BW_A$) to obtain a second digital signal. The second digital signal is stored in a buffer. The first digital signal is further digitally filtered through a second filter having a second bandwidth ($BW_B$) to obtain a third digital signal. An $FFT_M$ processing of the third digital signal is initiated and simultaneously, an $FFT_N$ processing of the second digital signal is initiated. The $FFT_M$ processed third digital signal is then decoded and, based on the decoding of the $FFT_M$ processed third digital signal, a determination is made of whether to complete the $FFT_N$ processing of the second digital signal from the buffer.

19 Claims, 3 Drawing Sheets

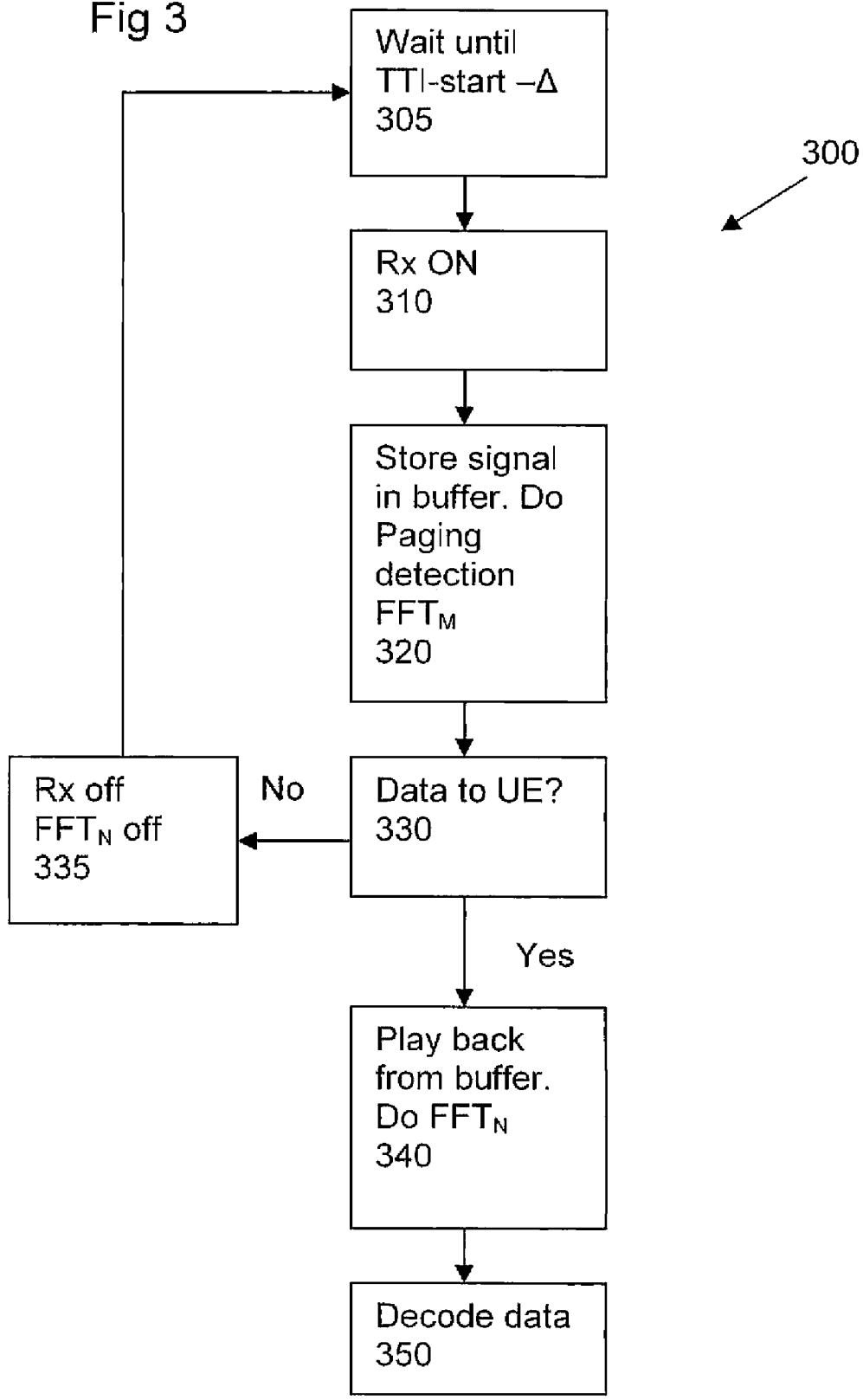

METHOD AND APPARATUS FOR FAST FFT PROCESSING OF PAGING INFORMATION

CROSS-REFERENCE TO RELATED APPLICATIONS

This application claims the benefit of U.S. Provisional Application No. 60/743,115, filed Jan. 10, 2006, the disclosure of which is incorporated herein by reference.

FIELD OF THE INVENTION

The present invention relates generally to communication systems and, more particularly, to wireless communication systems adapted to use Orthogonal Frequency Division Multiplexing (OFDM) modulation techniques.

BACKGROUND

Evolving mobile cellular standards such as Global System for Mobile Communications (GSM) and Wideband Code Division Multiple Access (WCDMA) will likely require modulation techniques such as OFDM in order to deliver higher data rates. OFDM is a method for multiplexing signals which divides the available bandwidth into a series of frequencies known as carriers. OFDM is somewhat immune to inter-symbol interference (ISI) because its symbol duration is longer than the symbol duration in single-carrier modulation techniques such as CDMA and TDMA. To further reduce ISI, guard periods are appended to the OFDM symbol. The guard periods may be comprised of a cyclic prefix of the OFDM symbol. Introducing cyclic prefix in OFDM makes OFDM robust against delay spread and facilitates comparatively higher data rates.

In order to ensure a smooth migration from existing cellular systems to high capacity, high data rate systems using existing radio spectrum, new systems must be able to operate on a flexible bandwidth (BW). Super third generation (S3G) has been proposed as a new flexible cellular system. S3G is intended as an evolution of the 3G WCDMA standard supporting only packet data services. S3G will likely use OFDM and operate on BWs spanning from 1.25 MHz to 20 MHz. Data rates of up to 100 Mb/s will be possible in the high bandwidth S3G service. In order to achieve such high data rates, the latency or round-trip time (RTT) must be below 10 milliseconds (ms). RTT is the time taken for a packet of data to travel across the network with an acknowledgement sent back to the transmitter. Hence, it is expected that transmission time intervals (TTIs), which are the length of a coded block, will be about 0.5 ms.

S3G's flexibility, short RTT and high data rates will present additional complexity to mobile terminal design. For example, packet paging detection must occur quickly in order to have a power efficient mobile terminal implementation that is adapted to quickly switch between the on state and sleep state. In other words, user equipment (UE) must be designed to have a low duty cycle even in a 0.5 ms TTI case. The duty cycle is the relative amount of time the radio is turned on. A low duty cycle means that the radio is turned on for a short duration of time compared to the time when it is turned off.

FIG. 1 shows a proposed S3G TTI of 0.5 ms. The time duration of each TTI is always the same but the number of OFDM symbols can vary from 6-8 depending of the size of the cyclic prefix. In cells where a large cyclic prefix is needed, there are fewer OFDM-symbols compared to cells with a small delay spread. As seen in FIG. 1, the OFDM symbols include paging information 101, other control information 102 such as broadcast and synchronization information, and data 103. The paging information 101 is incorporated in the first OFDM symbol. Since paging information 101 typically consists of 10-100 bits and each OFDM symbol consists of 4800 bits, based on a 20 MHz BW, with 1200 carriers and 16 Quadrature Amplitude Modulation (QAM), only a very small fraction of the first symbol consists of paging information. In order to have some frequency diversity, the paging information is spread out, for example over 1 MHz. This is still a much smaller BW compared to the total BW, for example, up to 20 MHz.

In a conventional method of paging detection, paging information is first sent to the UE and then the non-paging data is sent. In order to save as much power at the terminal or UE as possible, the radio and baseband processor in the UE should be turned off if it is not needed. What is desired is a method and apparatus for detecting paging information more efficiently in a wide BW, high data rate S3G implementation. Such a method and apparatus would send paging information and non-paging data at the same time. Such a method and apparatus would reduce the duty cycle and thereby reduce UE power consumption.

SUMMARY

The present invention comprises a method and corresponding apparatus for fast FFT processing of paging information in a communications system. The method of the present invention includes receiving an analog signal. The analog signal is then converted to a first digital signal and digitally filtered through a first filter having a first bandwidth ($BW_A$) to obtain a second digital signal. The second digital signal is stored in a buffer. The first digital signal is further digitally filtered through a second filter having a second bandwidth ($BW_B$) to obtain a third digital signal. An $FFT_M$ processing of the third digital signal is initiated and simultaneously, an $FFT_N$ processing of the second digital signal is initiated. The $FFT_M$ processed third digital signal is then decoded and, based on the decoding of the $FFT_M$ processed third digital signal, a determination is made of whether to complete the $FFT_N$ processing of the second digital signal from the buffer.

The apparatus of the present invention which implements the above method includes a front end receiver adapted to receive and down convert an RF signal to a base band signal. An analog-to-digital (A/D) converter is coupled to the front end receiver and is adapted to convert the analog signal to a digital signal. A first digital filter is coupled to a first branch from the output of the A/D converter, the first digital filter having a predetermined bandwidth ($BW_A$). A buffer is coupled to the digital filter and is used to store the digital signal. An $FFT_N$ processor having N stages and adapted to process the digital signal, is coupled to the output of the buffer. A clock/timer is coupled to a second branch from the output of the A/D converter and is adapted to switchably couple the second branch from the output of the A/D to a second digital filter having a predetermined bandwidth ($BW_B$). An $FFT_M$ processor having M stages is coupled to the output of the second digital filter and a paging detector is coupled to the output of the $FFT_M$ processor. The paging detector is adapted to detect the paging information signal. The method and apparatus of the present invention uses certain features of the S3G system, including flexible bandwidth and the paging information structure, to reduce the duty cycle, and hence the power consumption, of the UE. Using the method and apparatus of the present invention, the time for FFT processing of the paging information is significantly reduced for wide BW S3G implementations.

BRIEF DESCRIPTION OF THE SEVERAL VIEWS OF THE DRAWINGS

FIG. 3 is a flow chart of the method of the present invention.

DETAILED DESCRIPTION

Figure 1:
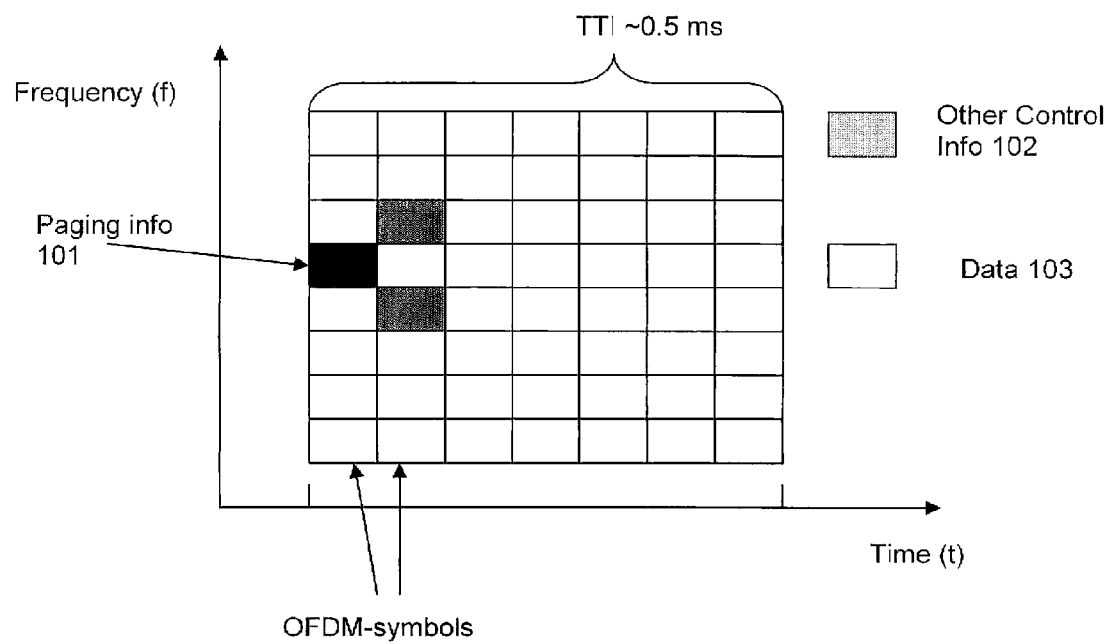
FIG. 1 illustrates a conventional OFDM signal.

Illustrative embodiments of the present invention are described below. In the interest of clarity, not all features of an actual implementation are described herein. It will be appreciated that in the development of any such actual embodiment, numerous implementation-specific decisions must be made to achieve the inventor's specific goals, such as compliance with system-related constraints which vary from one implementation to another. Moreover, it will be appreciated that such a development effort might be complex and time-consuming, but would nevertheless be a routine undertaking for those of ordinary skill in the art.

The method and apparatus of the present invention takes advantage of certain features of the S3G system, including flexible bandwidth and the paging information structure, to reduce the duty cycle, and hence the power consumption, of the UE. In the method and apparatus of the present invention, the receiver (RX) in the UE is off until a new TTI, assuming there was no data for the UE in the last TTI. Certain modules of the radio are turned on at time Δ just before the start of the TTI so that the radio is stable when the TTI starts. In other words, the modules of the radio which are turned off in standby or idle mode are turned on to receive the paging information and data. The signal received by the radio is down-converted and an FFT module begins to process the first OFDM symbol. The FFT size for one OFDM symbol is N, where in S3G, N is 2048 carriers but only 1200 carriers are used if the bandwidth is 20 MHz. If the BW is equal to 10 MHz the size of the FFT is 1024 carriers but only 600 are used. The rest are set to zero. The first OFDM symbol is processed by the FFT and the paging information is extracted and detected. If a packet is detected as being intended for the UE, the FFT processing continues over the complete TTI, otherwise the baseband processor of the receiver is turned off with as little delay as possible after the paging detection. The quicker the paging detection is turned off, the lower the duty cycle. The time for processing an FFT is proportional to the system clock and to the FFT length. For FFT implementations of reasonable complexity, the time for FFT processing is proportional to N up to N·log$_2$ (N). Processing a 20 MHz BW signal wherein N=2048, and the system clock is 100 MHz, the time for FFT processing is from N/f$_{clock}$≈20 μs to N·log$_2$ (N)/f$_{clock}$≈225 μs depending on the implementation. Because the TTI is 0.5 ms, and one OFDM symbol is 70 μs where there are 7 OFDM symbols in one TTI, the FFT processing time is significant relative to the paging information, thereby increasing the duty cycle.

Because paging information is concentrated in a small BW, for example 1 MHz, a smaller FFT length, such as N=128, is used for FFT processing of the paging information, thereby reducing the processing time to 1.3 μs (a factor 16) or 9 μs (a factor 25) depending on the FFT implementation. The time for processing the FFT if f$_{clock}$=100 MHz is calculated as follows:

Where $N = 2048$:

$$t_1 = \frac{N}{f_{clock}} = \frac{2048}{100*10^6} \approx 20 \ \mu s$$

$$t_2 = \frac{N*\log_2(N)}{f_{clock}} = \frac{2048*\log_2(2048)}{100*10^6} \approx 225 \ \mu s$$

Where $N = 128$:

$$t_1 = \frac{N}{f_{clock}} = \frac{128}{100*10^6} \approx 1.3 \ \mu s$$

$$t_2 = \frac{N*\log_2(N)}{f_{clock}} = \frac{128*\log_2(128)}{100*10^6} \approx 9 \ \mu s$$

As a result, performance is increased by the following factors:

$$\frac{t_{1:2048}}{t_{1:128}} = \frac{20}{1.3} = 16$$

$$\frac{t_{2:2048}}{t_{2:128}} = \frac{225}{9} = 25$$

Furthermore, in order to use the small FFT, the present invention filters the paging information from the complete OFDM symbol. Such filtering is efficiently implemented by using a digital filter optimized for S3G reception, where, for example, the complete BW is 1.25 MHz.

Figure 2:
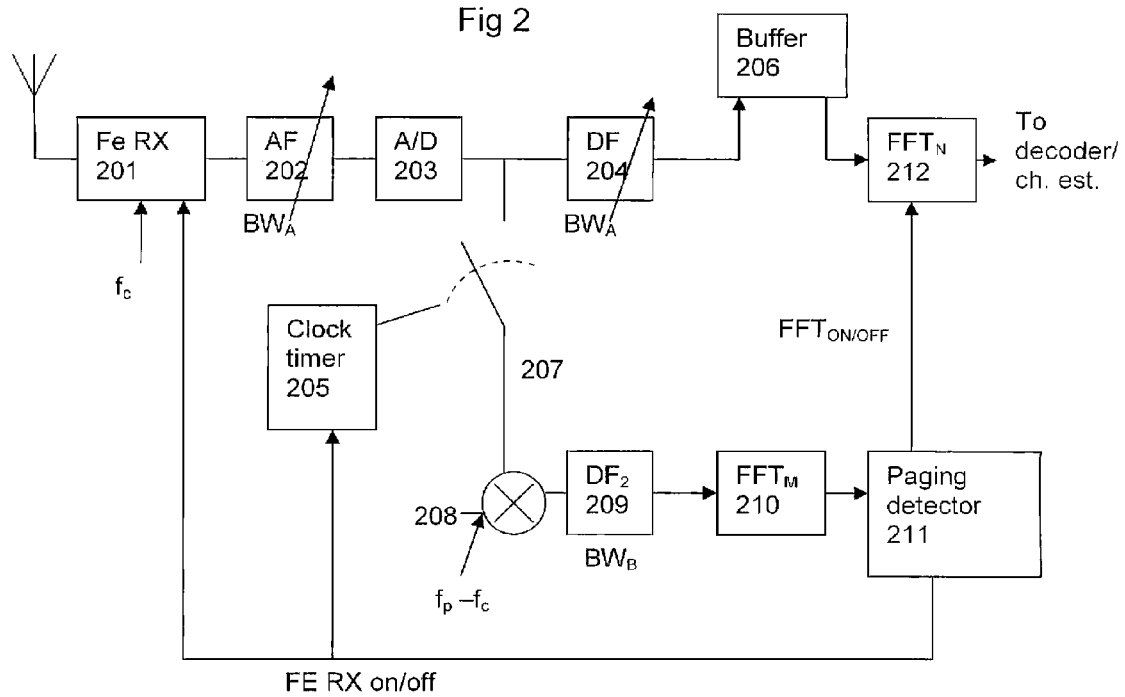
FIG. 2 illustrates a block diagram of a UE receiver adapted to process data according to the apparatus of the present invention.

Referring now to FIG. 2, a block diagram 200 of baseband processor of a UE receiver adapted to process data according to the apparatus of the present invention is provided. The operation of the baseband processor of the UE is described when in a connected mode to a S3G OFDM system using BW$_A$, where A is, for example, 20 MHz. Optional analog filter (AF) 202 and required digital filter (DF) 204 are adapted to BW$_A$. Internal clock timer 205 turns on the baseband processor of the UE prior to a TTI start. As seen in FIG. 2, a signal is received and down converted to a baseband signal in the front end receiver (Fe RX) 201, analog filtered at AF 202 and converted from an analog to digital signal at analog-to-digital (A/D) converter 203. The signal is digitally filtered at DF 204 and stored in buffer 206. The first OFDM symbol, containing packet paging information, is also fed to a second branch 207, digitally down converted by digital mixer 208 to the center frequency of the paging information (f$_p$), and the paging information is filtered out using a digital low pass (LP) filter (DF2) 209 having a BW adapted to the paging information BW$_B$. Note that digital mixer 208 is unnecessary if the paging information is in the middle of the symbol. The paging information is FFT processed by FFT$_M$ processor 210 having M stages. In an embodiment of the present invention, M=128. The output from FFT$_M$ processor 210 is fed to paging detector 211, which is adapted to detect the paging information signal. If there are any data packets for the UE, the signal is played back from buffer 206 to FFT$_N$ processor 212 having a large N. In an embodiment of the present invention, N=2048. FFT$_M$ processor 210 and FFT$_N$ processor 212 may have any appropriate dimensions, provided M is less than N. After the signal is retrieved from buffer 206, the entire OFDM signal is FFT processed by FFT$_N$ processor 212. If data is not intended for the UE, the reception is terminated and the baseband processor is placed in standby or idle mode. In standby or idle mode the UE turns off Fe RX 201, optional AF 202, A/D 203, DF 204, DF2 209, paging detector 211 and $FFT_M$ and $FFT_N$. The only thing that remains on is internal clock/timer 205 that controls the timing.

FIG. 3 shows a flow chart of the method of the present invention. As seen therein, a receiver having a baseband processor as seen in FIG. 2 remains in standby or idle mode until a time Δ prior to the TTI start at step 305. The value of Δ is such that the radio is stable when the TTI starts. The radio is turned on at step 310 and a signal is received and down converted and stored in a buffer at step 320. The first part of the signal is also filtered through the narrowband digital filter ($BW_B$) and $FFT_M$ processed at step 320 to extract the paging information. The paging information is then detected at step 330. If the processed paging information indicates that the accompanying data is not intended for the UE, the reception is terminated, the radio and baseband processor is placed on standby or idle mode at step 335, the buffer is erased and the process returns to waiting until a time Δ prior to the TTI start. As previously noted, in standby or idle mode the UE turns off Fe RX 201, optional AF 202, A/D 203, DF 204, DF2 209, paging detector 211 and $FFT_M$ and $FFT_N$ as seen in FIG. 2. The only thing that remains on is internal clock/timer 205 that controls the timing. If the paging information indicates that the accompanying data is for the UE in the current TTI, the stored information in the buffer is played back and $FFT_N$ processing of the complete ($FFT_M$) signal occurs at step 340. Thus the signal is decoded at step 350.

In the above description it has been assumed that the entire $BW_A$ signal is stored and only $FFT_N$ processed if the paging information indicates that the data is for the UE. Alternatively, the $FFT_N$ processing can be performed in parallel with the $FFT_M$ processing. In this alternative method, if the paging information indicates that the accompanying data is not for the UE, the $FFT_N$ processing is terminated There are a number of advantages of the method of the present invention over conventional methods and apparatus. In apparatus implementing either described method, data processing delay is reduced when compared to processing by conventional means.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The innovative concepts described in the present application can be modified and varied over a wide range of applications. Accordingly, the scope of patented subject matter should not be limited to any of the specific exemplary teachings discussed above.

What is claimed is:

1. A method for fast FFT processing of paging information in a communications system, comprising the steps of:
   receiving an analog signal;
   converting the analog signal to a first digital signal;
   digitally filtering the first digital signal through a first filter having a first bandwidth ($BW_A$) to obtain a second digital signal;
   storing the second digital signal in a buffer;
   digitally filtering the first digital signal through a second filter having a second bandwidth ($BW_B$) to obtain a third digital signal;
   initiating an $FFT_M$ processing of the third digital signal and simultaneously initiating an $FFT_N$ processing of the second digital signal;
   decoding the $FFT_M$ processed third digital signal; and
   determining, based on the decoding of the $FFT_M$ processed third digital signal, whether to complete the $FFT_N$ processing of the second digital signal from the buffer.

2. The method of claim 1, wherein the third digital signal comprises packet paging information.

3. The method of claim 1, wherein the second digital signal includes non-paging data.

4. The method of claim 1, wherein $BW_A$ is wider than $BW_B$.

5. The method of claim 1, wherein the received signal is an orthogonal frequency division multiplexed (OFDM) signal.

6. The method of claim 5, for use in a Super third generation (S3G) communication system.

7. The method of claim 1, wherein $BW_A$ is about 1.25 MHz.

8. The method of claim 1, further comprising filtering the analog signal prior to converting it to a digital signal.

9. The method of claim 1, further comprising mixing the first digital signal with another signal in a mixer to down convert the first digital signal so that the third digital signal is a center frequency of a paging information ($f_p$) signal.

10. An apparatus for fast FFT processing of paging information in a user equipment (UE), comprising:
    a front end receiver adapted to receive and down convert an RF signal to a base band signal;
    an analog-to-digital (A/D) converter coupled to the front end receiver adapted to convert the analog signal to a digital signal;
    a first digital filter coupled to a first branch from the output of the A/D converter, the first digital filter having a predetermined bandwidth ($BW_A$);
    a buffer coupled to the digital filter adapted to store the digital signal;
    an $FFT_N$ processor having N stages adapted to process the digital signal, the $FFT_N$ processor coupled to the output of the buffer;
    a second digital filter having a predetermined bandwidth ($BW_B$);
    a clock/timer coupled to a second branch from the output of the A/D converter, the clock/timer adapted to switchably couple the second branch from the output of the A/D converter to the second digital filter;
    an $FFT_M$ processor having M stages coupled to the output of the second digital filter; and
    a paging detector coupled to the output of the $FFT_M$ processor, the paging detector adapted to detect a paging information signal.

11. The apparatus of claim 10, wherein M of the $FFT_M$ processor is less than N of the $FFT_N$ processor.

12. The apparatus of claim 11, wherein N of the $FFT_N$ processor is about 2048.

13. The apparatus of claim 10, wherein M of the $FFT_M$ processor is about 128.

14. The apparatus of claim 10, further comprising the UE adapted to retrieve the information stored in the buffer if the paging information signal detected by the paging detector indicates that the signal is intended for the UE.

15. The apparatus of claim 10, further comprising the UE adapted to place the front end receiver, FFT processors and filters in standby mode if the paging information signal detected by the paging detector indicates that the signal is not intended for the UE.

16. The apparatus of claim 10, adapted to process an orthogonal frequency division multiplexed (OFDM) signal.

17. The apparatus of claim 16, for use in a Super third generation (S3G) system.

18. The apparatus of claim 10 further comprising an analog filter coupled between the output of the front end receiver and the input of the analog-to-digital (A/D) converter, the analog filter adapted to filter the base band signal.

19. The apparatus of claim 10 further comprising a mixer switchably coupled between the second branch from the output of the A/D converter and to the second digital filter, the mixer adapted to down convert to the center frequency of a paging information ($f_p$) signal, the clock/timer adapted to switchably couple the mixer to the second branch from the output of the A/D.

* * * * *